United States Patent [19]

Kosikowski

[11] Patent Number: 4,515,815
[45] Date of Patent: May 7, 1985

[54] LOW SODIUM CHLORIDE RIPENED RENNET CHEESES BY ULTRAFILTRATION

[75] Inventor: Frank V. Kosikowski, Ithaca, N.Y.

[73] Assignee: Cornell Research Foundation, Inc., Ithaca, N.Y.

[21] Appl. No.: 459,926

[22] Filed: Jan. 21, 1983

[51] Int. Cl.$^3$ .............................................. A23C 19/05
[52] U.S. Cl. ................................... 426/40; 426/491; 426/582; 426/804
[58] Field of Search ...................... 426/34, 36, 40, 42, 426/491, 582, 804

[56] References Cited

U.S. PATENT DOCUMENTS 4,018,752  4/1977  Bühler et al. ........................ 426/804
4,271,201  6/1981  Stenne ................................. 426/582

OTHER PUBLICATIONS

Payne et al., The Low Sodium Cook Book; Little, Brown & Company, 1953, p. 14.
Kosikowski, Cheese & Fermented Milk Foods; Kosikowski, 1966, p. 79.
Kosikowski, Cheese & Fermented Milk Foods; Kosikowski 2nd ed., 1977, pp. 510-516.
Kosikowski-New Developments in Milk and Cheese Fermentation Processes, 8th Anal. Sym., 1973.
Jolly et al., J. Dairy Sci., 58: 1272-1275, (1975).
78th Annual Meeting of American Dairy Science Assoc.
Kosikowski, J. Dairy Sci., 62: 41-46, (1979).
Kosikowski, Fermented Food, Current Science and Technology, Proceedings 8th Ann. Symp., West NY State Institute of Food Technology and NY State Agric. Exp. Sta. Cornell Univ., 11/15/73.
Sood et al., J. Food Protection, 42: 958-960, (1979).
Kosikowski, Second Bienniel Marschall Internat. Cheese Conf., Madison, Wisconsin, Sep. 1981, paper No. 1981-54.
Covacevich et al., J. Dairy Sci., 61: 529-535, 701-709, (1978).
Kosikowski, J. Dairy Sci., 57: 488-491, (1974).
Kosikowski, J. Dairy Sci., 63: 1975-1980, (1980).
Sood et al., J. Dairy Sci., 62: 1713-1718, (1979).
Bush et al., J. Dairy Sci., 66: 415-421, (1983).
Covacevich et al., J. Food Sci., 42: 1362-1367,72, 1359-1361,79, (1977).

*Primary Examiner*—Raymond Jones
*Assistant Examiner*—Marianne S. Minnick

[57] ABSTRACT

This invention relates to low sodium chloride ripened rennet cheeses and particularly cheddar cheeses. The cheeses generally contain less than about 1.2 percent sodium chloride, and preferably between about 1 percent and about 0.7 percent sodium chloride for cheddar cheeses and its sub-types. The cheeses are made from milk having its total protein content increased from about 1.1 to about 2 times and preferably 1.3 to about 1.9 times its original total protein content by the use of ultrafiltration.

10 Claims, No Drawings

LOW SODIUM CHLORIDE RIPENED RENNET CHEESES BY ULTRAFILTRATION

BACKGROUND OF THE INVENTION

Sodium in foods is generating considerable controversy, but the issue is complex; [Anonymous, 1980, Dietary Salt, *Food Technology* 34: 85; Albernethy, J. D., 1979, Sodium and Potassium in High Blood Pressure, *Food Technology,* 57: 12; Niven, C. F., Jr. 1980, Technology of Sodium in Processed Foods: General Bacteriological Principles. In "Sodium and Potassium in Foods and Drugs", ed. P. L. White and S. Crocco, Am. Med. Assn., Chicago, Il, p. 45]. Cheese quality is heavily dependent on sodium chloride (salt) in the cheese serum to restrain microbial spoilage organisms and as noted by Olson, [Olson, N. F., 1982, Effect of sodium reduction on natural cheeses, Dairy Field, 165: 48], any attempt to reduce levels significantly will be difficult, requiring new scientific and technical approaches. The development and use of a simple, accurate analytical quantitative test for sodium in cheese has been investigated by Kindstedt et al. [Kindstedt, P., L. R. Mattick and F. V. Kosikowski, 1982, A Simple Sleective Sodium Ion Electrode Method for determining Sodium in Cheese, (SIE), Supplement 1, *J. Dairy Sci.,* 65: 65]. Several analytical reports from USDA sources [Posati, L. P. and M. L. Orr, 1976, Composition of Foods, *USDA Agr. Handbook No.* 8-1, USDA, Washington, D.C.; Watt, B. C. and A. L. Merrill, 1963, Composition of Foods, *USDA Agr. Handbook No.* 8, p. 22, USDA, Washington, D.C.] show for cheddar cheese an average of 700 milligrams per hundred grams of cheese in one report and 620 milligrams in another. Cheeses with low sodium chloride levels are known to become acid, bitter and pasty during ripening [Davis, J. G., 1965, Cheese, American Elsevier Co., Inc. p. 281; Van Slyke, L. L. and W. V. Price, 1956, *Cheese,* Orange Judd Publishing Co., Inc., New York, p. 187]. This condition did not, however, exist in the low sodium chloride cheeses of the invention. The qualities of the cheeses of the invention are good to excellent and are accompanied by typical cheese flavor without apparent loss of the salty flavor.

Apparently the known high buffer capacity of milk retentates plays an important role in the present invention. Low salt cheese made without retentate or sublevels of supplementation displayed lower pHs down to 4.7 than those containing high levels of retentate. As a result, in such low salt cheeses more insoluble calcium and phosphorus apparently were dissolved early and lost to the free whey or during pressing. Additional dehabilitating factors are suggested by Dyachenko, et al. [Dyachenko, P. F., E. V. Shchedushnow and M. El-Abd, 1970, Changes in the Casein-Calcium Phosphate Complex During a Cheesemaking Process Involving Cheddaring, Brief Communications, *Proceed.* 18th *Int. Dairy Congress,* Vol. 1E, p. 302] who outline changes in the casein-calcium phosphate complexes during cheesemaking, which solubilized under excess acidity.

Excessive loss of calcium or phosphorus salts just before and during pressing under high acid conditions may be a factor in the poor quality of low salt, nonretentate cheeses.

Regulatory and medical groups are promulgating guidelines for sodium levels of food, based on an individual standard serving which, for ripened cheeses, is one ounce or 28.4 grams. Retentate supplemented cheeses of the invention without any added potassium chloride displayed good to excellent qualities at 114 to 142 milligrams sodium per standard serving, as measured using the selective ion electrode method (referenced above and hereinafter referred to as SIE) and 77 to 117 milligrams (mg) using the inductively coupled plasma emission spectographic method (hereinafter referred to as PEE). Such cheeses averaging 124 and 101 milligrams (mg) of sodium per serving, respectively, would fall into a class of basic foods suggested recently by the American Medical Association to be identified as low sodium; [Rothschild, L., 1982, AMA Hits 5 mg. Increment Requirement in Sodium Labeling Proposal, *Food Chemical News,* Sept. 20, p. 12].

Research on the supplementation of cheese milks with whole milk retentates from ultrafiltration in order to increase manufacturing efficiency of normal composition ripened cheese has been reported; [Kealy, K. S. and F. V. Kosikowski, 1980, Adapting Cheddar Cheese Manufacture to Whole Milk Retentate Supplementation, *J. Dairy Sci. Supplement* 1, 63: 61; Kosikowski, F. V., 1979, Yields and Volumes of Cottage and Cheddar Cheese as Influenced by Retentate Additions, *J. Dairy Sci. Supplement* 1, 62: 38]. However, no attempt has been made to apply these principles for improving quality of cheese containing very low levels of sodium chloride. The present invention deals particularly with high quality cheddar cheeses purposely made low in sodium chloride but the principles are applicable to any ripened cheese made with rennet reducing the sodium chloride to appropriate levels.

DESCRIPTION OF THE INVENTION

Cheese making, the principles necessary to make cheddar cheese and other ripened rennet cheeses and the like, are well known in the art, see for example, Cheese and Fermented Milk Foods, 2nd Ed., 3rd printing with revisions, 1982, by Frank V. Kosikowski, Kosikowski & Associates, Brooktondale, N.Y. The process of the invention is particularly applicable to cheddar cheese (also known historically, geographically and on utilitarian grounds as "store-wrapped dairy", "English Yankee" or "American" cheese. The process of the invention is also applicable to the various subtypes of cheddar cheese including washed curd, Colby and Monterrey, stirred curd, coon, sage and pineapple, and to other ripened rennet, cheese varieties including low moisture mozzarella, Swiss and Blue.

The fermentation pattern for cheddar cheese is initiated on a rennet-coagulated milk curd. Development of lactic acid from lactose by streptococci starts early and continues steadily and strongly in the curd, during the various manufacturing steps in the cheese vat. At salting, the peak acidity has almost been attained, and the lactic acid fermentation is largely arrested.

Bacterial cultures of starters for cheddar cheese are invariably lactic acid streptococci and sometimes enterococci, or their combination. Depending on the region and the season, the level of starter required varies from 0.5 to 5 percent. In the springtime, when cows come out to pasture the starter requirements are higher. A smooth, homogeneous curd is formed by rennet in 30 minutes. Following cutting, the cubes of curd are cooked into whey, usually at about 100° F. The whey is then removed and the curd cubes, acquiring more lactic acid, mat together into a cohesive mass and are cut into distinct blocks.

Piling or re-piling of the curd blocks over a prolonged period is called cheddaring, giving the cheese its major distinctive features. At optimum acidity, the cheddared curd blocks are reduced in size for salting by milling or chopping. Calculated amounts of salt are uniformly incorporated to check the lactic acid fermentation, to assist in transforming the insoluble curd to a more soluble form and to flavor the cheese. The salted curds are pressed to form the compact, young cheese into various shapes and styles.

In most cheddar cheesemaking, usually after the vat is one-quarter full it is necessary to wait 15 to 60 minutes after the starter is added to the cheesemilk. The Marschall test indicates the optimum point of milk ripening and when rennet, necessary for curd forming, is to be added to the vat.

The speed at which excess lactic acid is produced in the vat affects the cheese quality. Lactic acid is preferably developed at a steady, upward rate. This compound serves to attain a satisfactory pH after salting. For best cheesemaking, the acidity after the first turning of the curd slabs should be 0.2 to 0.25 percent, measured as a titratable acidity of the whey produced after the first turning.

The milk for cheddar cheese is generally heated directly by live steam entering the vat jacket. The temperature is carefully controlled to prevent adverse effects on the cheese starter bacteria growth and acid production. Normally 38° C. is the peak temperature in cooking curds for cheddar cheese. A higher temperature shocks the commercial lactic acid starter organisms, *Streptococcus lactis* and *Streptococcus cremoris*. *Streptococcus thermophilus* and enterococci starters, i.e., *Streptococcus faecalis* or *Streptococcus durans* produce acids satisfactorily, following high cooking temperatures of 43° to 49° C.

Cheddar cheese is usually ripened at a predetermined moisture content. The cheesemaker adjusts moisture through the application of proper cheesemaking techniques, known in the art.

Natural American cheddar cheese is usually prepared with 1.5 percent salt. Over 2 percent makes the cheese too dry and slows the ripening, leaving underdeveloped body and flavor. In practice, cheddar cheese in the United States ranges between about 1.4 to about 1.8 percent salt. Typically, directions call for adding 2.3 pounds of salt per 100 pounds of curd for cheddar cheese. This includes a calculated compensatory addition, as about 45 percent of the cheese salt is lost to the whey in the vat and the press. Following salting, the cheese is pressed. Some manufacturers use pressure of 60 PSI for 6 to 18 hours; others press cheese blocks in vacuum chambers, for example, placing pre-pressed hoops of cheese into a vacuum compression chamber for 45 minutes under 27 inches vacuum. After this, the cheese is removed and inserted into a standard hydraulic press for a minimum of 1 hour at 50 PSI. Also, vacuum pressing very large curd blocks is practiced. Salted curds weighing many hundreds of pounds or more are placed in a large, metal compression chamber and a piston presses it into one large block. This is removed and cut into 40 or 60 pound blocks wrapped in aluminum-polyehtylene film, then thermally sealed. Following pressing, cheddar cheese ripening is conducted in temperature and moisture controlled rooms, for example, at 2° to 16° C., and at approximately 85% relative humidity. Various cheddar cheeses are ripened in various manners, as is known in the art.

A typical procedure for preparing cheddar cheese from pasteurized and heat-treated milks is as follows:

Ripening the Milk

8:00 A.M.

Procedure

To warm, clarified, pasteurized (161° F. (71.7° C.) for 16 sec.) whole milk resting in a cheese vat, add, while mixing thoroughly, 0.5% active lactic starter. Increase the starter to 1.0% in May and June. Alternatively, heat treat milk after clarification using the same pasteurizer to 145° F. (62.8° C.) for 15 sec., and mix in 1% starter. Increase to 2.0% or more in May and June in the U.S.A.

Adjust the milks to a final setting temperature of 88° F. (31.1° C.).

For colored cheese, incorporate enough annatto cheese color to suit the market, (30 ml./1,000 lb. milk gives a straw color).

Setting the Milk

8:30 A.M.

After the starter has been in contact with the milk for 15 to 30 min., or when the Marschall test indicates, add 90 ml. per 1,000 lb. milk single-strength (1:15,000) rennet extract. Dilute the measured rennet extract 1:40 with tap water before introduction.

Run the mechanical vat agitator at medium speed for 5 min. Then stop it and remove the detachable paddles.

Draw one pail of cheesemilk through the gate valve and return it to the cheese vat. Cover the vat and hold the milk quiescent for 25 min., the time required for curd formation.

Cutting the Curd

9:30 A.M.

Test the strength of the curd with a dairy thermometer. Then cut it into cubes, using ¼ in. or wider wire cheese knives. Where a higher moisture is desired, use wire knives up to ⅜ in. in width.

Stir the cut curd mass for 5 min. with agitators at slow speed.

Dislodge any loose curd clinging to the vat sides, draw one pail of curds and whey through the gate valve, and return it to the cheese vat.

Cooking the Curds

9:45 A.M.

Start cooking gradually, using only steam in the cheese vat jacket.

Attain a peak temperature of 100° F.(37.8° C.) in 30 min. (2° F. rise per 5 min.) with steady agitation.

Throttle or close the steam valve and maintain the above peak temperature for 45 min. more.

Agitate the curds at medium speed from time to time throughout the cooking and holding period.

Draining the Whey

11:00 A.M.

Stop all agitation and let curds settle, then remove the agitator paddles and push the curds through the whey to the end of the vat with a curd rake.

Insert the strainer and open the exit gate valve. The greenish colored whey is diverted either to a cream separator or to a storage tank.

During run-off fill part of the jacket of the vat, but not the vat itself, with 38° C. water. This keeps the vat warms for cheddaring.

Cheddaring the Curd

11:30 A.M.

When the curds appear to be about one inch below the surface of the whey, trench them over the length of the vat. Permit the trenched curd to mat for 15 min. following complete whey removal.

Cut longitudinally down the middle of two trenched curd columns with a large bread knife. Then cut the columns horizontally at approximately 10-in. intervals. Space the curd blocks about 1 in. apart. Let them rest for 15 min. and turn them over.

Repeat twice at 15 min. intervals. Sweep any loose curds under the blocks. Next, pile the individual blocks or slabs double, and turn these double blocks every 15 min. until the end of the cheddaring period so that new surfaces are exposed. If it seems necessary, the blocks are piled three high for the last 30 min. The higher the block piling, the more moisture is retained in the final cheese. Curd blocks initially are about 26×5×4 in.

Obtain titratable acidities on the clear whey as it runs from the vat gate exit at the beginning, middle, and end of the recommended cheddaring period. Just before milling, the desired titratable acidity for pasteurized milk cheese is 0.50–0.60%; for heat-treated milk cheese, 0.65–0.70%. If the whey acidity is below this range, continue cheddaring. Optimum curd pH is 5.3–5.2 before milling at which point the curd blocks or patties have flattened down from 4 into 2 in.

Milling the Curd Slabs

1:30 P.M.

Feed the flattened-out curd slabs into a milling machine suspended over the cheese vat. The milled curds will drop back into the vat. Watch out for the sharp, moving rotary blades!

Turn the curds over and spread them out with a stainless steel hand fork during milling.

Upon completion, remove the milling machine and stir the cut curds with an overhead mechanical agitator using special fork ends for salting. The milling machine should be rinsed quickly before the curd surfaces dry.

Salting the Curds

1:45 P.M.

During mechanical curd forking, spread coarse cheese salt by hand over the cut curds at 2.3 lb. per precalculated or estimated 100 lb. cheese curd. Apply the salt in three portions, allowing each portion to dissolve before the addition of the next, and mechanically fork the cheese steadily for the remainder of the 30-min. period. Prepare as for waxed cheese, see below, or as rindless cheese.

Hooping and Pressing

2:15 P.M.

As Waxed Cheese

Select a desired style and size of metal form or hoop. Fix a new, proper-sized, light cloth bandage at the bottom edge of a detachable steel rim with the cloth rib to the inside.

At the bottom of the metal mold or hoop, place one unbleached muslin cap cloth wetted in warm salt water. Then lay one dry starched circle on top.

Fit the rim into the metal mold and lock it. Folds of the light cloth bandage should then extend down into the mold and the ends are spread over the bottom.

Weigh the amount of cheese curds required for the style used into the prepared cloth-lined mold. Fold the top ends of the bandage over and apply another wetted, unbleached muslin cap cloth to the cheese surface. Place a metal plate or follower on top, and insert the mold into a horizontal hydraulic press set at 25 p.s.i. gauge water pressure. Apply pressure slowly and employ vacuum chamber if available.

Take the mold out of the press in 30–60 min. for dressing or straightening of the bandage. Remove the top plate or follower with a hook, and then the detachable rim. Take off the muslin cap cloth and pull the cloth bandage very gently up the side of the curd block to eliminate any possible wrinkles on the sides. Wrinkles lead to cracks in the cheese. Fold the top of the cloth bandage neatly over the cheese, and wet it with warm salted water for better adhesion and to produce a smooth, hard rind. Center a new, dry, starched circle on top and follow it with the cap cloth.

Wet the surface liberally with salt water and insert the metal plate or follower. If the cheese bulk exceeds the shoulder of the mold, also replace the rim; otherwise, leave it off. Put the cheese and mold back in the press overnight and leave at 25–50 p.s.i.

Drying the Cheese

Make Day plus 18 hrs.

For Waxed Cheese Only

Remove the cheese from the press. Take off the metal plate, rim, and cap cloth. Run a speed knife or spatula between the cheese and the metal mold. Invert the metal mold and with a sharp tap or bang, drop the cheese out. Remove the bottom cap cloth.

Stamp or stencil the date of manufacture, vat number, and the type of cheese and other required information on the cloth cheese surfaces.

Place the pressed, cloth-bound cheese on clean wooden shelves in a drying room at about 55° F. (12.7° C.) and 70% relative humidity, for 2–3 days. Turn daily. A lower drying temperature may make the cheese surfaces sweat when the cheese is brought out for paraffining, and may lead to loose bonding.

Curing the Waxed Cheese

Make Day plus 96 hrs.

Paraffin the whole cheese at 245° F. (118.3° C.) for 6 sec. After the paraffin is hard, place the cheese in a new box with clean top and bottom beaverboard liners. Mark the outside of the box with the same markings as are on the cheese. Place the boxed cheeses on top of each other, without shelves, in an 85% relative humidity curing room at 40° F. (4.4° C.). Hold them for 60 days or longer. The peak flavor is usually attained in 9–12 months.

Optionally, to force-cure if the green cheese is of good quality, store the cheeses for 2 mos. at 38° F. (3.3° C.), then move them to a warmer room and let them mature for 4–7 mos. at 50° F. (10° C.). The peak flavor is usually attained in 6–9 mos. Label cheese from pasteurized milk as pasteurized cheese and cheese from raw or heat treated milk as aged over 60 days.

Making Rindless Cheddar Cheese

Procedure

Following salting of Cheddar curds, as above, line Wilson stainless steel molds or hoops with either a precut, washable, unbleached muslin cloth soaked in warm, slightly salted water, or with a dry, precut, single-service cottonized paper. Attainment of lower moisture, 36–36.5%, in rindless cheese gives ginest quality.

For the 40-lb. rindless cheese style, weigh 43.0 lb. curd into a hoop, and for the 20-lb. rindless cheese style, weigh 22.5 lb. curd.

Fold the cloth or paper over the top of curds and fit the metal top on, then place the hoop in a horizontal hydraulic press at 40 p.s.i. After several hrs. pressing, remove cheese blocks from forms and apply film wrappings as outlined in Packaging chapter. Alternatively, if facilities are available press 640 lb. lots of cheese or more in large vacuum chamber, and reduce, after ripening, into small units.

New forced air propulsion systems integrated with openend cheddaring tables now move curds directly into filling hopper. Under these circumstances prepress curds in hoops for one minute, add lid, and place full forms in vacuum chamber at 27 inches for 45 mins. Then remove and press at 50 p.s.i. for 1 hr. or more in standard press. Open the press, take out blocks, heat seal with film as outlined in Packaging chapter, or seal in Cryovac rubberized material after evacuation and hot water shrinkage at 200° F. (93.3° C.) for 2 sec.

Alternatively if proper equipment and forms are available, press 650 lb. lots of cheese curd or more, optionally using a large vacuum chamber, and ripen. Thereafter, reduce block into small units. Mechanization of cheddar cheesemaking employs similar principles, but on a larger scale and by more mobile movements.

Cheddar Cheese From Raw Milk

Procedure

Follow the directions exactly as outlined for pasteurized milk cheddar cheese, as above, but (a) replace the pasteurized milk with good quality, unheated, raw milk; set at 88° F. (31.1° C.).

(b) add 1.0% lactic starter, instead of 0.5%; increase to 2.0% in May and June.

(c) during the milk ripening, determine the time for adding rennet to the milk with a Marschall rennet cup test. Add rennet extract to the milk when the milk, containing proper amounts of starter, clots halfway down the cup or between 2 and 3 spaces on a 5-space cup. If the reading registers at less than 2, commence cheesemaking immediately;

(d) mill the curd slabs when the final whey titratable acidity tests 0.60–0.70%. Extend the cheddaring period to 0.8% titratable acidity if gas holes or unclean flavor are detected in the curds;

(e) cure the cheese at 36° F.(2.2° C.) until a desirable flavor is attained.

Washed Curd Cheddar Cheese

Procedure

Follow the directions for making heat-treated or pasteurized milk Cheddar cheese precisely, until after the milling of the cheddared curd slabs as outlined above. Then introduce the following additional step, below, right after the statement, "The milling machine should be rinsed quickly before the curds have an opportunity to dry on its surfaces", and before the major step of "salting the curds".

Washing and Chilling the Milled Curds

1:45 P.M.

Cover the milled curd with enough clean, cool, 60° F. (15.6° C.) water so that the temperature is reduced to about 80° F. (26.7° C.). Hold the curds under water at this temperature without stirring for 15 min. Then drain the water completely from the vat.

Salting the Curds

2:30 P.M.

Initiate the salting step, and follow it with hooping and pressing exactly as practiced for regular Cheddar cheese-making.

In the process of the invention, the starting milk utilized in the process of the invention is enriched in protein content by ultrafiltration. The milk employed in the process of the invention is enriched based on total protein content, about 1.1:1 to about 2.0:1 and preferably about 1.3:1 to about 1.9:1. This can be accomplished by employing as the sole milk constituent the retentate of an ultrafiltration process which concentrates the milk protein to the desired levels. Alternatively, the starting milk can be a blend of retentate having protein levels more concentrated than above, e.g., 4 or 7:1 or higher (for example 8:1 up to 11:1, the upper limit usually being governed by the readily available membranes) blended with a conventional starting milk to provide the desired total protein content concentration within the above useful ranges. The resultant starting protein enhanced milk can be subjected to any known ripened, rennet moderated cheesemaking process, using standard cheesemaking techniques but for the use of reduced levels of sodium chloride. The use of the protein enhanced milk described above allows the reduction of sodium chloride in the renneted cheese by at least about 10%, usually between about 10% and about 60%, and preferably between about 20 and 50% from the sodium chloride levels usually present in the conventional ripened, rennet cheese without significantly adversely affecting the properties of the cheese which characterize it as the particular conventionally recognized cheese variety.

The ultrafiltration process is employed to form the retentate to either directly form the starting protein enriched milk or to form the concentrate which is blended with conventional starting milk. In an ultrafiltration process such is already known as useful in concentrating milk proteins. The ultrafiltration membrane is one which retains fat, and true protein (e.g. casein, albumin, globulin) and insoluble salts and which passes water and a portion of the lactose, soluble salts and non-protein nitrogen present in the milk. Generally, membranes which have a molecular weight cutoff at about 20,000 daltons are employed. Preferably the ultrafiltration process is conducted at a slightly elevated temperature, usually between about 50° C. and about 60° C. and preferably between 52° C. and about 54° C. to speed the ultrafiltration process and prevent denaturation of protein.

In the salting step of the cheesemaking process of this invention for Cheddar and its subtypes, sodium chloride is usually added in an amount by weight between about 0.7% and about 1.2% and preferably about 0.75 and about 1.0%. With the attendant sodium chloride losses in processing, for example, in the whey, the resultant cheeses of the invention have a sodium content between about 300 mg per 100 grams and about 500 mg per 100 grams and preferably between about 300 to about 400 mg per 100 grams as measured by SIE. As measured by PEE the sodium content is between 270 and 410 mg per 100 grams and, preferably, between 270 to 350 mg per 100 grams. For other ripened cheese varieties the salt requirements are different but percentage wise the sodium levels are reduced significantly from conventional levels by the use of the milk concentrates of the invention coupled with the use of reduced sodium chloride levels.

EXAMPLE

Retentate Mixtures

Approximately 500 gallon lots of bulk fresh raw whole milk from the Cornell Dairy Farm at Harford, N.Y. were concentrated up to approximately 4.5:1 in a Dorr-Oliver Iofor ultrafiltration unit (Dorr-Oliver, Stamford, Conn.) containing approximately 20 sq.m. of membrane surface with a molecular weight cut-off of 20,000 daltons.

Ultrafiltration was conducted at 52° C. for approximately 2 hours. The retentate was heat-treated to 69° C. without timed holding and cooled quickly to 5° C. On the following day fresh pasteurized milk (72° C.—16 sec.) and heat-treated milk (69° C.—16 sec.) from the Cornell University Dairy Plant were supplemented with the retentate described here. Cheddar cheese was made from these mixtures according to Kosikowski [Kosikowski, F. V., 1982, Cheese and Fermented Milk Foods, 2nd Ed., Edwards Brothers, Inc., Ann Arbor, Mich. 48106].

Five experimental cheesemaking trials each requiring cheese milk mixtures with differing total protein obtained by supplementation as above were carried out. Milk mixture lots of 13.6 kg. each were placed in small stainless steel vats resting in insulated metal containers partially filled with water. Next, they were inoculated with 10 ml. of thawed, direct-set, commercial frozen bulk concentrated starter, (Miles-Marschall, Madison, Wis.) ripened at 32° C. for 15 to 30 minutes and set with 20 ml. per 100 kg. bovine single strength rennet (Hansens, Milwaukee, Wis.). The curd was cut with 1.3-cm. wire knives and left unagitated for 15 minutes. Curds and whey were then heated to 38° C. in 30 minutes with constant manual stirring and for 30 minutes with intermittent stirring. After whey removal the curds were cheddared, milled, salted, and pressed at 2.8 kg. per cm$^2$ in 0.9 kg. round metal forms lined with cheesecloth. On the following day the wheels were removed and dried for a few hours, waxed and wrapped in aluminum foil. They were ripened at 10° C. for 2 and 4 months.

Analysis and Quality Evaluation

Cheddar cheeses were analyzed for total solids by the AOAC method [Association of Official Analytical Chemists, 1975, Official Methods of Analysis, 12th Ed. *Assoc. Official Anal. Chem.*, Washington, D.C.] for sodium chloride by the modified Volhard procedure, [Wilster, G. H., W. V. Price, A. J. Morris, E. F. Goss and G. P. Sanders, 1940, Determination of Fat, Moisture and Salt in Soft Cheese, *J. Dairy Sci.*, 23: 197] and for mineral elements by two methods, one according to Kenworthy [Kenworthy, A. L., 1960, Photoelectric spectrometer analysis of plant materials, Rep. Annual Mtg. 1970 Am. Soc. Hortic. March] by an inductively coupled plasma emission spectrograph at a central University laboratory (PEE) and the other, by a selective sodium ion electrode (SIE) [Kindstedt, P., L. R. Mattick and F. V. Kosikowski, 1982, A Simple Selective Sodium Ion Electrode Method for Determining Sodium in Cheese, Supplement 1, *J. Dairy Sci.*, 65: 65]. pH was obtained with a Model 230 glass electrode potentiometer (Fisher Scientific Co., New York, N.Y.) and titratable acidity with N/10 NaOH and phenolphthalein.

Cheddar cheese quality was ascertained from mean scores with standard deviations, reported by three experienced tasters using a numerical evaluation of 10 to 0 to indicate excellent to unacceptable cheeses. Defect listings were obtained from those outlined in the official American Dairy Science Association score card for Cheddar cheese.

RESULTS

Five experimental trials required 30 vats of cheese. Each experimental trial produced six cheeses, containing at random 0.75 to 1.2% sodium chloride, made from non-retentate and retentate-supplemented cheese milk mixtures. The whole milk retentates used for supplementation averaged, 30.4% TS, 14.5% fat, 12.4% total protein and 1.4% ash.

Cheese Characteristics

Table 1 shows the mean moisture and sodium chloride concentrations and quality scores of 30 Cheddar cheeses made from cheese milk mixtures supplemented with different levels of whole milk retentate up to approximately 2:1 concentration based on total protein. The sodium chloride levels of resulting cheeses including controls, were low, but moisture concentrations were normal, averaging 36.9%. Other major components, not shown, too were normal in concentration. Quality of such cheeses ripened at 10° C. for 2 and 4 months was directly related to degree of retentate supplementation. Mean quality scores for flavor, and body and texture of these low sodium chloride cheeses increased to an optimum from supplemented milks concentrated between 1.5:1 to 1.9:1, Tables 1 and 2. A linear regression analysis of data in Table 1 showed the correlation coefficient (r) between total protein of milk mixtures concentrated up to 1.9:1 and flavor quality of 2 and 4 month low sodium cheeses, held at 10° C., was 0.93 and 0.92. Against body-texture of the same cheeses (r) was 0.87 and 0.88. When analysis was restricted to total protein concentration of 1.8:1 the correlation coefficient for flavor was 0.96 and 0.93 and for body-texture, 0.93 and 0.93.

The ripened low sodium chloride control cheeses made from milks without retentate were acid, bitter and pasty, and lacked cheese flavor. Cheeses made from milks supplemented with increasingly higher levels of whole milk retentate did not display these defects and were of good to excellent quality with considerable typical cheese flavor. A slight decline in the mean body and texture scores of cheeses made from a milk mixture of 1.9:1 concentration is attributable to their drier bodies.

TABLE 1

EFFECT OF RETENTATE SUPPLEMENTED WHOLE MILKS ON THE QUALITY OF LOW SODIUM CHLORIDE CHEDDAR CHEESES[L1]

| Trials[L2] | Protein of Mixtures (mean) % | Concentration Ratio (mean) | H₂O Content of Cheeses (mean) % | Sodium Chloride Level of Cheeses (mean) % | Mean Quality Scores[L3] | | | |
|---|---|---|---|---|---|---|---|---|
| | | | | | Flavor | | Body/Texture | |
| | | | | | 2 mths | 4 mths | 2 mths | 4 mths |
| 5 | 3.36[L4] | 1:1 | 37.2 | 1.03 | 5.7 (1.4) | 4.7 (.46) | 6.1 (1.2) | 6.0 (1.5) |
| 5 | 3.75 | 1.1:1 | 36.8 | 1.06 | 6.7 (1.1) | 5.4 (1.0) | 6.7 (.89) | 6.7 (1.3) |
| 5 | 4.37 | 1.3:1 | 36.8 | 1.07 | 7.9 (.94) | 7.8 (.78) | 7.7 (.73) | 8.1 (.42) |
| 5 | 4.97 | 1.5:1 | 37.8 | 1.02 | 8.9 (.22) | 8.1 (.69) | 8.7 (.57) | 8.5 (.41) |
| 5 | 5.97 | 1.8:1 | 36.7 | 1.07 | 9.2 (.41) | 8.8 (.38) | 8.7 (.35) | 8.8 (.33) |
| 5 | 6.26 | 1.9:1 | 36.1 | 1.12 | 9.0 (.23) | 8.9 (.17) | 8.4 (.64) | 8.4 (.66) |

[L1]Ripened at 10° C.
[L2]Cheesemaking conducted during winter of 1982.
[L3]Quality Code: Excellent 9-10, Very Good 8-9, Good 7-8, Fair 6-7, Poor 5-6, Very Poor 4-5, Unacceptable <4
[L4]Control milks - no supplementation.
( ) = Standard deviation.

Sodium in Cheeses

Sodium in cheese is derived from milk salts and added sodium chloride. Two of the experimental lots, 18282 and 17282, showing individual vat data of 12 Cheddar cheeses, Table 2, reflect the levels of sodium as measured by the selective sodium ion electrode method (SIE) and by the inductively coupled plasma emission spectrographic method (PEE). Sodium ranged from 320 to 500 mg./100 g. cheese by SIE and from 280 to 410 mg. per 100 g. cheese by PEE and was unrelated to retentate concentration. Sodium reduction, compared against an average sodium value of standard Cheddar cheeses at 700 mg./100 g. [Watt, B. C. and A. L. Merrill, 1963, Composition of Foods, USDA Agr. Handbook No. 8, p. 22, USDA, Washington, D.C.], varied between 54 to 29% by WIE, and 61 to 41% by PEE.

At the above reduced sodium levels the mean cheese quality scores generally improved as the retentate milk mixture concentrations based on total protein increased to 1.9:1. In lot 18282, for example, vat 1 made without retentate, gave cheese of poor quality whereas vat 4 supplemented with retentate to a 1.5:1 concentration, gave cheese of good quality. In either example the sodium reduction using SIE was 43% compared with commercial Cheddar cheese. A visual and color photography comparison of cheeses in lots 18282 and 17282, made from unsupplemented milks, or supplemented only to 1.3:1 concentration, showed them possessing a whitish, opaque nature. Above this concentration retentate supplemented cheeses were straw colored with a lively semi-translucent appearance. Typical cheese flavor, data not shown, increased as retentate supplementation rose and attained maximum levels at concentration ratios of between 1.6:1 to 1.8:1.

TABLE 2

INFLUENCE OF RETENTATE SUPPLEMENTED WHOLE MILKS ON THE QUALITY OF CHEDDAR CHEESES CONTAINING REDUCED SODIUM LEVELS

| Vat | Protein of Mixtures | Concentration Ratio | Sodium Content of Cheeses By | | Sodium Reduction In Cheeses | | Mean Quality Scores[L3] | | | |
|---|---|---|---|---|---|---|---|---|---|---|
| | | | SIE mg/100 g. | PEE mg/100 g. | SIE % | PEE % | Flavor | | Body/Texture | |
| | | | | | | | 2 mths | 4 mths | 2 mths | 4 mths |
| LOT-18282[L5] | | | | | | | | | | |
| 1 | 3.37[L4] | 1:1 | 400 | 310 | 43 | 56 | 5.3 (2.3) | 4.3 (.58) | 5.3 (1.2) | 5.3 (1.5) |
| 2 | 3.71 | 1.1:1 | 320 | 270 | 54 | 61 | 6.3 (1.5) | 4.3 (1.5) | 6.0 (1.0) | 6.7 (1.5) |
| 3 | 4.39 | 1.3:1 | 450 | 370 | 36 | 47 | 8.0 (1.0) | 8.4 (.58) | 7.3 (.58) | 8.0 (0) |
| 4 | 4.92 | 1.5:1 | 400 | 320 | 43 | 54 | 8.7 (.58) | 8.7 (.58) | 8.3 (1.2) | 8.3 (.58) |
| 5 | 5.62 | 1.7:1 | 440 | 360 | 37 | 49 | 9.3 (.29) | 8.8 (.76) | 8.3 (.58) | 8.8 (.29) |
| 6 | 6.31 | 1.9:1 | 460 | 320 | 34 | 54 | 9.3 (.58) | 9.0 (.29) | 8.8 (.29) | 8.3 (.58) |
| LOT-17282[L5] | | | | | | | | | | |
| 1 | 3.40 | 1:1 | 400 | 320 | 43 | 54 | 5.7 (1.5) | 4.3 (.58) | 6.0 (1.7) | 5.7 (1.5) |
| 2 | 3.77 | 1.1:1 | 360 | 280 | 49 | 49 | 6.7 (2.1) | 6.0 (1.0) | 6.0 (1.4) | 6.7 (1.5) |
| 3 | 4.38 | 1.3:1 | 460 | 370 | 34 | 47 | 7.7 (1.5) | 7.7 (.58) | 7.0 (1.0) | 8.3 (.58) |
| 4 | 4.97 | 1.5:1 | 480 | 380 | 31 | 46 | 9.0 | 8.3 | 8.3 | 9.0 |

TABLE 2-continued
INFLUENCE OF RETENTATE SUPPLEMENTED WHOLE MILKS ON THE QUALITY OF CHEDDAR CHEESES CONTAINING REDUCED SODIUM LEVELS

| | | Sodium Content of Cheeses By | | Sodium Reduction In Cheeses | | Mean Quality Scores[L3] | | | |
|---|---|---|---|---|---|---|---|---|---|
| | | | | | | Flavor | | Body/Texture | |
| Vat | Protein of Mixtures | SIE | PEE | SIE | PEE | 2 mths | 4 mths | 2 mths | 4 mths |
| | | mg/100 g. | | % | % | | | | |
| 5 | 5.59 | 1.6:1 | 400 | 350 | 43 | 50 | (0) 9.7 (.58) | (.58) 9.0 (0) | (1.2) 8.3 (.58) | (0) 9.0 (0) |
| 6 | 6.22 | 1.8:1 | 500 | 410 | 29 | 41 | 9.0 (0) | 9.0 (0) | 8.0 (1.8) | 8.8 (.29) |

[L1]SIE = Selective sodium ion electrode method; PEE = Inductively coupled plasma emission spectrographic method.
[L2]Compared with 700 mg./100 g. sodium of USDA average commercial Cheddar cheeses [Att, B. C. and A. L. Merrill, 1963, Composition of Foods, USDA Agr. Handbook No. 8, p. 22, USDA, Washington, D.C.]
[L3]Quality Code: Excellent 9–10, Very Good 8–9, Good 7–8, Fair 6–7, Poor 5–6, Very Poor 4–5, Unacceptable <4.
[L4]Control milks - no supplementation.
[L5]Whole milk retentate composition = $H_2O$-70.2%, Fat-14.3%, Protein-12.1%, Ash-1.4%.
( ) = Standard deviation.

Potassium, Calcium and Phosphorous

A standard mineral element analysis was conducted on the 12 low sodium cheeses of lots 18282 and 17282 by the inductively coupled plasma spectrograph (PEE). Calcium, phosphorous, and potassium in cheeses made with increasing inputs of whole milk retentate are shown in Table 3.

TABLE 3
POTASSIUM, CALCIUM AND PHOSPHORUS LEVELS IN LOW SODIUM CHEDDAR CHEESES MADE FROM RETENTATE SUPPLEMENTED MILKS.

| Vat | Protein of Mixtures % | Concentration Ratio | K | Ca | P | P/Ca |
|---|---|---|---|---|---|---|
| | | | | mg/100 g[L2] | | |
| | | | | LOT-18282 | | |
| 1 | 3.37[L1] | 1:1 | 55 | 489 | 405 | .83 |
| 2 | 3.71 | 1.1:1 | 48 | 586 | 481 | .82 |
| 3 | 4.39 | 1.3:1 | 44 | 657 | 506 | .77 |
| 4 | 4.92 | 1.5:1 | 77 | 646 | 499 | .77 |
| 5 | 5.62 | 1.7:1 | 66 | 724 | 541 | .74 |
| 6 | 6.31 | 1.9:1 | 123 | 650 | 486 | .75 |
| | | | | LOT-17282 | | |
| 1 | 3.40[L1] | 1:1 | 76 | 597 | 478 | .80 |
| 2 | 3.77 | 1.1:1 | 53 | 591 | 478 | .81 |
| 3 | 4.38 | 1.3:1 | 41 | 641 | 509 | .79 |
| 4 | 4.97 | 1.5:1 | 36 | 661 | 510 | .77 |
| 5 | 5.59 | 1.6:1 | 54 | 704 | 535 | .76 |
| 6 | 6.22 | 1.8:1 | 45 | 730 | 556 | .76 |

[L1]Control milk - no supplementation.
[L2]Standard average K, Ca and P of commercial cheddar cheese are 82, 750 and 478 mg/100 g. [Watt, B. C. and A. L. Merrill, 1963, Composition of Foods, USDA Agr. Handbook No. 8, p. 22, USDA, Washington, D.C.]

With one exception, potassium was lower than normally found in commercial Cheddar cheese and was unrelated to level of retentate supplementation. Calcium and Phosphorous were low in non-supplemented milk cheeses, but generally increased with supplementation and attained maximum levels at 1.8:1 and 1.9:1 concentrations. The highest calcium level was 730 mg./100 g. cheese, and that of phosphorous, 556 mg./100 g., with P/Ca ratios dropping as supplementation increased.

In Cheddar cheeses of the present invention, calcium and phosphorous low in the controls, generally increased with whole milk retentate supplementation. The pH's of the cheeses from the higher supplemented milks generally were normal, 5.0-5.2. Cheese made from supplemented milk of highest concentration in one lot displayed a calcium level approaching that of commercial Cheddar cheese while its phosphorous levels were higher, Table 3. However, as retentate supplementation increased the P/Ca ratios of the resulting cheeses dropped from 0.83 to 0.64 in one lot and from 0.80 to 0.76 in the second. These ratios were still higher than in commercial reference Cheddar cheese.

Sodium was obtained by the selective sodium ion electrode method for cheese of Kindstedt et al. [Kindstedt, P., L. R. Mattick and F. V. Kosikowski, 1982, A Simple Selective Sodium Ion Electrode Method for Determining Sodium in Cheese, Supplement 1, *J. Dairy Sci.*, 65: 65] and by the inductively coupled plasma emission spectrographic method based on the work of Kenworthy [Kenworthy, A. L., 1960, Photoelectric Spectrometer Analysis of Plant Materials, Rep. Annual. Mtg., 1970 Am. Soc. Hortic., March]. The spectrographic method, averaged approximately 20% less sodium in the 12 cheeses listed, Table 2, agreeing with observations of earlier work [Kindstedt, P., L. R. Mattick and F. V. Kosikowski, 1982, A Simple Selective Sodium Ion Electrode Method for Determining Sodium in Cheese, Supplement 1, *J. Dairy Sci.*, 65: 65]. As the selective sodium ion electrode method results correlated highly (r=0.99) with atomic absorption analysis [Kindstedt, P., L. R. Mattick and F. V. Kosikowski, 1982, A Simple Selective Sodium Ion Electrode Method for Determining Sodium in Cheese, Supplement 1, *J. Dairy Sci.*, 65: 65] they are accepted with greater confidence. The lower results by the spectrographic method, now undergoing further study, appear restricted to sodium.

It is noted that experiments with direct use of ultrafiltration retentate at appropriate concentration gave results equivalent to the results obtained by supplementation as specifically exemplified above.

As an alternative embodiment of the invention similar high quality low sodium cheeses can be obtained without the use of ultrafiltration. During the making of cheddar cheese with reduced salt levels it was noted that when salt was reduced, pH during the pressing process was lowered beyond the point normally required to form high quality cheese (e.g. 5.3 to 5.0). If prior to the pressing step the low sodium cheese curd is augmented with sufficient food grade buffer salts (other than sodium salts) to maintain the pH of the cheese during the pressing step between about 5.3 and about 5.0, high quality cheddar cheese can be obtained.

The principle buffering ions excessively lost in the whey of low sodium cheddar cheese are calcium and phosphate. Therefore, the preferred ions added comprise calcium and phosphate, from individual compounds or as a calcium phosphate. Preferably upon addition the calcium phosphate has limited solubility (for example as a food grade complex or the like).

It should be realized that within the scope of the above description the invention can be practiced other than as specifically described and exemplified.

I claim:

1. In a process of making a ripened rennent cheese selected from the group consisting of a Cheddar, low moisture Mozzarella, Swiss and Blue wherein a milk component is coagulated and ripened, the improvement which comprises
   (a) employing as the starting milk component a milk containing an enriched protein level wherein the enriched protein level to original milk protein level is about 1.3:1 to about 1.9:1, where said protein level is obtained by ultrafiltration of milk, and
   (b) employing reduced levels of sodium chloride in the cheese making process sufficient to reduce the level of sodium chloride in the resultant ripened cheese by at least about 10% from the levels present in the conventional cheese, thereby providing a cheese without significantly affecting flavor, body and texture properties.

2. A reduced sodium chloride, ripened, rennet cheese produced by the process of claim 1.

3. A process as in claim 1 wherein the cheese is a cheddar cheese.

4. A process as in claim 3 wherein in the cheesemaking process the curd is salted with between about 0.7 to about 1.2 parts of sodium chloride per 100 parts of Cheddar curd.

5. A reduced sodium chloride Cheddar cheese produced by the process of claim 4.

6. The Cheddar cheese as in claim 5 containing between about 300 to about 475 mg. of sodium per 100 grams of cheese.

7. A ripened, rennet cheese produced by the method of claim 1 having sodium chloride levels between about 10% and about 60% less than the same cheese made by standard cheesemaking practice.

8. A ripened, rennet cheese produced by the method of claim 1 having sodium chloride levels between about 20% and about 50% less than the same cheese made by standard cheesemaking practice.

9. A process as in claim 3 wherein the amount of sodium chloride employed produces a ripened cheese containing between about 300 to about 475 mg of sodium per 100 grams of cheese.

10. A process as in claim 1 wherein the resultant ripened cheese has sodium chloride levels between about 20% and about 50% less than the same cheese made by standard cheese making practice.

* * * * *